United States Patent [19]
Johnson

[11] Patent Number: 6,044,582
[45] Date of Patent: Apr. 4, 2000

[54] FLOATING ROPE MARKER ASSEMBLY FOR CULLING FISH

[76] Inventor: William Roger Johnson, 6446 Ralston St., Ventura, Calif. 93003

[21] Appl. No.: 09/063,433

[22] Filed: Apr. 21, 1998

Related U.S. Application Data

[60] Provisional application No. 60/052,429, Jul. 14, 1997.
[51] Int. Cl.[7] .......................... A01K 65/00; A01K 97/00
[52] U.S. Cl. .................... 43/4; 43/43.1; 223/103
[58] Field of Search ................ 43/1, 4, 4.5, 55, 43/43.1; 224/103; 441/6, 11

[56] References Cited

U.S. PATENT DOCUMENTS

| | | | |
|---|---|---|---|
| 2,092,638 | 9/1937 | Carpenter | 223/103 |
| 3,561,652 | 2/1971 | Ruter | 224/103 |
| 4,328,916 | 5/1982 | Lucas | 224/103 |
| 4,484,405 | 11/1984 | Woods | 43/4.5 |
| 5,048,219 | 9/1991 | Georgescu | 43/4 |
| 5,207,013 | 5/1993 | Bartok | 43/4 |
| 5,600,873 | 2/1997 | May | 441/6 |
| 5,761,843 | 6/1998 | Lynch | 43/4.5 |

OTHER PUBLICATIONS

Apr. 1997 B.A.S.S. Times, "The Cull–R–Rope System" by Louie Stout, B.A.S.S. Times Senior Writer.

*Primary Examiner*—Kurt Rowan
*Attorney, Agent, or Firm*—Gene W. Arant; Larry D. Baker

[57] ABSTRACT

The floating rope marker is comprised of a rope assembly having a braided hollow rope with an upper end portion being turned in and threaded back inside itself and a lower end portion being turned in through a side wall of the rope and threaded back inside the rope to form a loop so that the two end portions of the rope are close together within the rope. A cylindrical float member is inserted in the turned in portion of the upper end and a section of heat shrinkable tubing is shrunk on the lower end portion of the rope to hold the turned in portion of the lower end porton in place. A hook having a base is held in the lower end portion loop and a hook part adapted for releasably holding a fish extends downwardly in the water.

5 Claims, 1 Drawing Sheet

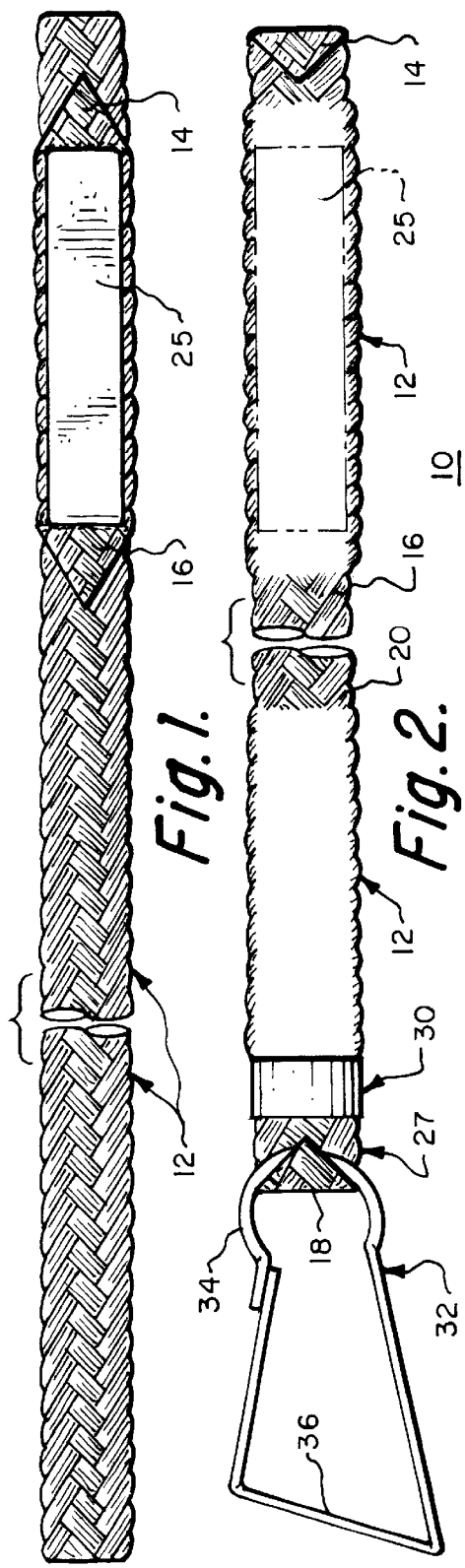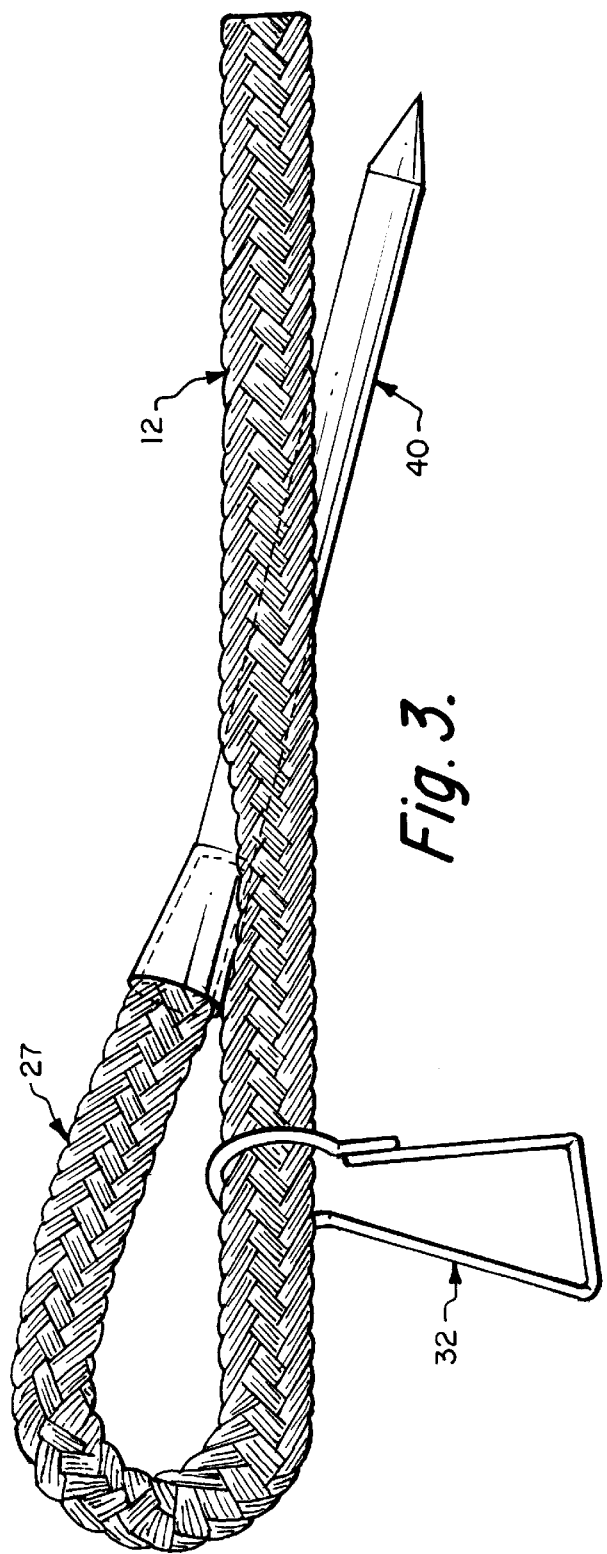

FLOATING ROPE MARKER ASSEMBLY FOR CULLING FISH

RELATED APPLICATION

This application claims the benefit of my U.S. Provisional application Ser. No. 60/052,429 filed Jul. 14, 1997.

FIELD OF THE INVENTION

This invention relates to apparatus for use in the sport of fishing.

BACKGROUND OF THE INVENTION

It is important for a fisherman, when fishing in a tournament, to have a quick and easy way to cull fish by weight. There have been numerous markers on the market that attach to the fish to identify it by color to the fisherman. He records the color of marker and the weight of the fish on paper or in some other way.

In a Bass fishing tournament, the limit of a single fisherman is five fish, the limit for a team is seven fish, and salt water limits can be ten fish. Markers are often sold in sets of five or seven. When the limit number of fish is caught and put in the the live well, and the fisherman has caught another fish, it is time to start culling. When he weighs the next fish, he has no more markers left, with the sets of markers now available. If he determines that the fish is heavier than any one of his limit, he may want to keep it, but he can't get the fish into the live well quickly. He either has to hold on to the gasping fish, or let the poor fish flop around in the boat until he gets a marker off another fish. First, he has to choose the marker of the lighter fish, chase it around the live well and untangle the marker lines, unclip the fish and clip the marker on the new fish. Many of those markers now sold have a tendency to tangle.

SUMMARY OF THE INVENTION

The present invention provides floating markers which are easy to handle and which enable rapid identification of the weight of each fish held on one of the markers.

According to the invention a floating marker assembly includes a floating rope assembly about a foot in length, one end of which is adapted to float on the surface of the water while its other end extends downwardly within the water to hold a hook on which a fish has been attached. The rope assembly is made from a braided hollow polypropylene rope otherwise about two feet in length, each end portion of which is turned in and threaded back inside itself so that the two ends of the rope are then close together. A float member is contained within the inturned portion of the upper end of the hollow rope. The lower end portion of the rope is turned in through the sidewall of the rope to form a loop before being extended into the interior of the rope. A shrink cover encloses the otherwise exposed surface of the lower end portion of the rope and is heat shrunk on it. A fish hook has a base part held within the looped end portion of the lower end of the rope, and also has a hook part for releasably holding a fish.

According to the invention the float member also provides rigidity to the upper end portion of the rope when acting as a handle. The shrink cover securely supports the looped lower end portion of the rope and the fish hook. The entire assembly is adapted to float vertically in water with the hook extending downwardly when no fish is attached to the hook.

PART NAMES AND NUMBERS 10 floating marker assembly
12 hollow rope
14 inturned upper end portion
16 end of 14
18 inturned lower end portion
20 end of 18
25 float member
27 loop in lower end of rope
30 shrink wrap member
32 fish hook assembly
34 base part of hook assembly
36 releasable hook portion of fish hook assembly
40 hollow fid used for assembly.

DRAWING SUMMARY

FIG. 1 is a partially cutaway side view of the rope 12 after its upper end portion 14 has been inturned and float member 25 placed inside it.

FIG. 2 is a side view of the assembly 10, in which the rope 12 is partially cutaway showing the float 25 in dotted lines, a loop 27 at its lower extremity, and fish hook assembly 32 secured within the loop.

FIG. 3 is a view of the rope 12 showing the first assembly procedure in which the pointed end of fid 40 is inserted into an empty space between braids of the hollow rope 12 to form loop 27 holding fish hook assembly 32.

DETAILED DESCRIPTION

The presently preferred embodiment of the invention is comprised mainly of a 24" piece of hollow braided polypropylene rope 12 of which the ends have been melted to prevent fraying. A metal, either tin or stainless steel, or even possibly plastic, safety pin type hook assembly 32 commonly found on fish stringers, is attached to the end of the rope 12 with the use of a fid 40.

Fid 40 is an elongated hollow plastic tool with a sharp end, which is used to weave rope into a hollow part of the same rope.

Float 25 is made from a 4" piece of closed cell polyfoam which will not get waterlogged but will float. It is inserted into a hollow part of the braid near one end of the rope as seen in FIGS. 1 and 2. It is presently preferred that the foam only fill about ⅓ of the hollow portion of the rope. The amount of foam selected depends upon the relative buoyancy of the foam, rope and hook. It is presently preferred to select an amount of foam that will float the rope vertically in the water with the hook attached. It is also preferred to have the float end of the rope float at the surface of the water when no fish is attached.

Additionally, it is presently preferred that the floating rope marker allow the fish to swim in the live well without causing them to be pulled to the surface.

The fourth part of the assembly 10 is a ¾" piece of ½" diameter heat shrink tubing 30 which is slid up the rope once the hook 32 is on the rope and the rope folded over into itself, as shown in FIG. 2. This secures the folded over piece of rope so that it will not slip out.

ASSEMBLY OF THE PRESENTLY PREFERRED EMBODIMENT

Turning to FIG. 3, take a tool called a fid 40, used for weaving rope into itself, and a piece of hollow braided polypropylene rope 10 approximately 24" long with ends of the rope melted to prevent fraying. Insert the pointed end of the fid about 6 inches from end of the rope 14 into the hollow rope towards direction of other end. Slip loop end of the hook 32 over the rope 10 and slide it up to the fid 40. Then insert the short end of the rope with the hook on it into hollow end of the fid and work the fid with the rope end inside it towards other end inside the hollow portion of the rope. Slide the pointed end of the fid 40 through the braids so that the pointed end of the fid exits the hollow portion of the rope 10. Pull the fid the rest of the way through the braids so that it completely exits the rope 10, but leaves the end 14 within the hollow portion. That should leave a small ½" loop 27 near the new end 14 of the rope 10 with the hook 32 attached.

Then slip a ¾" piece of the heat shrink tubing 30 up the rope 10 until it covers the junction of the insertion point of the end 14 of the rope 10. Use a hair dryer or other heat source to shrink tubing 30 to make a snug fit that secures fold over of rope 10.

A similar procedure is used, employing the fid 40, to turn the upper end of the rope 10 inside itself while placing the float 25 inside it.

Thus, it may be observed that both ends of the rope are similarly "turned in" through the sidewall of the rope using a fid. At the lower end of the rope, as shown in FIG. 2, the rope end 20 is not fully pulled into the interior of the rope, but a loop 27 is left which retains the hook. At the upper end of the rope, the rope end 16 (with the float 25 inside) is fully pulled through the sidewall into the interior of the rope, leaving no loop.

With the type of floating rope markers I invented for use in culling fish, my plan is to sell my floating rope markers in sets of 6 instead of 5, 8 instead of 7, and 11 instead of 10 for salt water, so that the fisherman can always have a spare floating rope marker. He can then weigh the fish, and put my type of rope marker on it, attaching the fish with the typical fish stringer type of safety pin type hook used commonly on fish stringers, and immediately put it in the live well. That way a fish is back in the water much quicker, since the ultimate goal is to release the fish alive at the end of a tournament. After the 6th fish is in the live well, he can look at his list of fish weights and colored rope markers, and grasp the color of a rope marker that holds the lightest fish, lift it easily out of the live well, unclip the fish and return it to the lake. He can easily grab the rope because it is floating due to the closed cell polyfoam that is inserted inside the hollow braided rope, and since the rope has the insert, it makes it easy to grip, and not slip through his fingers. My rope markers do not have a tendency to tangle. The shrink tubing at the hook end of the folded over rope keeps the hook secure to the rope so that the fisherman can confidently pull a heavy wiggling fish out of the live well.

What I claim is:

1. A floating marker assembly for a fish swimming in a live well, comprising:

a rope assembly of the order of one foot in length, having a normally upwardly disposed end adapted to float on the surface of the water and a normally downwardly disposed end which extends downwardly within the water to hold a hook on which a fish has been attached, the rope assembly including:

a) a braided hollow rope otherwise about two feet in length having a side wall, an interior, an upper end portion, and a lower end portion; the upper end portion of the rope being turned in and threaded back inside itself, and the lower end portion being turned in through the sidewall of the rope and threaded back inside the rope, thus forming a loop; the two end portions of the rope lying close together within the hollow of the rope;

b) a cylindrical float member about four inches in length disposed within the turned in portion of the upper end of the hollow rope so that it is securely held therein, the float member also providing rigidity to the upper end portion of the rope assembly when acting as a handle;

c) a securing member firmly enclosing a section of the side wall of the lower end portion of the rope to securely hold the turned in portion of the lower end of the rope in place; and d) a hook having a base part held within the lower end portion loop of the rope, and also having a hook part adapted for releasably holding a fish;

the entire assembly being adapted to float vertically in water with the hook extending downwardly when no fish is attached to the hook.

2. The floating marker assembly of claim 1, wherein the braided hollow rope is formed of polypropylene.

3. The floating marker assembly of claim 1, wherein the float member is formed of polyfoam.

4. The floating marker assembly of claim 1, wherein the securing member comprises a section of heat shrinkable tubing, the heat shrinkable tubing having been heat shrunk onto the lower end portion of the rope.

5. A floating marker assembly for a fish swimming in a live well, comprising:

a rope assembly of the order of one foot in length, having a normally upwardly disposed end adapted to float on the surface of the water and a normally downwardly disposed end which extends downwardly within the water to hold a hook on which a fish has been attached, the rope assembly including:

a) a braided hollow polypropylene rope otherwise about two feet in length having a side wall, an interior, an upper end portion, and a lower end portion; the upper end portion of the rope being turned in and threaded back inside itself, and the lower end portion being turned in through the sidewall of the rope and threaded back inside the rope, thus forming a loop; the two end portions of the rope lying close together within the hollow of the rope;

b) a cylindrical polyfoam float member about four inches in length disposed within the turned in portion of the upper end of the hollow rope so that it is securely held therein, the float member also providing rigidity to the upper end portion of the rope assembly when acting as a handle;

c) a section of heat shrinkable tubing firmly enclosing a section of the side wall of the lower end portion of the rope to securely hold the turned in portion of the lower end of the rope in place, the heat shrinkable tubing having been heat shrunk onto the lower end portion of the rope; and d) a hook having a base part held within the lower end portion loop of the rope, and also having a hook part adapted for releasably holding a fish;

the entire assembly being adapted to float vertically in water with the hook extending downwardly when no fish is attached to the hook.

\* \* \* \* \*